United States Patent
Bertran Monfort et al.

(10) Patent No.: US 12,061,509 B2
(45) Date of Patent: Aug. 13, 2024

(54) VOLTAGE DROOP AND OVERSHOOT MANAGEMENT USING NON-LINEAR SLOPE DETECTION

(71) Applicant: International Business Machines Corporation, Armonk, NY (US)

(72) Inventors: Ramon Bertran Monfort, New Orleans, LA (US); Pradeep Bhadravati Parashurama, Bhadravati (IN); Nitish Jindal, Bangalore (IN); Alper Buyuktosunoglu, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 13 days.

(21) Appl. No.: 18/082,494

(22) Filed: Dec. 15, 2022

(65) Prior Publication Data

US 2024/0201768 A1    Jun. 20, 2024

(51) Int. Cl.
*G06F 1/00* (2006.01)
*G06F 1/30* (2006.01)
*G06F 1/3203* (2019.01)
*G06F 1/26* (2006.01)

(52) U.S. Cl.
CPC ............ *G06F 1/305* (2013.01); *G06F 1/3203* (2013.01); *G06F 1/26* (2013.01)

(58) Field of Classification Search
CPC ............................... G06F 1/305; G06F 1/3203
USPC ........................................................ 713/300
See application file for complete search history.

(56) References Cited

U.S. PATENT DOCUMENTS

| | | | |
|---|---|---|---|
| 10,128,755 B2 | 11/2018 | Paul et al. | |
| 10,171,081 B1* | 1/2019 | Bose | H03K 17/162 |
| 10,483,961 B2 | 11/2019 | Bang et al. | |
| 10,742,202 B1 | 8/2020 | English et al. | |

(Continued)

FOREIGN PATENT DOCUMENTS

WO    2021238227 A1    12/2021

OTHER PUBLICATIONS

Li et al., "A Novel Method to Determine Droop Coefficients of DC Voltage Control for VSC-MTDC System," submitted to and accepted for publication in IEEE Transactions on Power Delivery, 2020, pp. 1-15, retrieved from https://core.ac.uk/download/pdf/286270754.pdf.

(Continued)

*Primary Examiner* — Volvick Derose
(74) *Attorney, Agent, or Firm* — Zilka-Kotab, P.C.

(57) ABSTRACT

A computer-implemented method for detecting n-level slopes for a voltage level in a processor, wherein n is greater than 1, includes monitoring a voltage in a processor for a voltage level corresponding to a predefined first edge, and monitoring for a voltage level corresponding to a predefined second edge within a first count limit from detection of the predefined first edge. In response to detecting the predefined second edge within the first count limit, the computer-implemented method includes monitoring for a voltage level corresponding to a predefined third edge within a second count limit from detection of the predefined second edge, and in response to detecting the predefined third edge within the second count limit, determining whether to adjust a power applied to the processor based on the monitored voltage levels.

24 Claims, 8 Drawing Sheets

(56) References Cited

U.S. PATENT DOCUMENTS

| | | | |
|---|---|---|---|
| 10,860,051 B2 | 12/2020 | Kalyanam et al. | |
| 11,029,742 B2 | 6/2021 | Webel et al. | |
| 11,119,126 B2 | 9/2021 | English et al. | |
| 11,137,822 B2 | 10/2021 | Gelman et al. | |
| 11,196,254 B2 | 12/2021 | Shirokov et al. | |
| 11,680,965 B2* | 6/2023 | Felix | G06F 1/28 |
| | | | 713/300 |
| 2010/0229021 A1 | 9/2010 | Konstadinidis et al. | |
| 2015/0042405 A1* | 2/2015 | Kim | H03F 3/21 |
| | | | 330/279 |
| 2015/0229303 A1* | 8/2015 | Li | H03K 17/145 |
| | | | 307/130 |
| 2018/0067541 A1* | 3/2018 | Chuang | G06F 1/305 |
| 2018/0183417 A1 | 6/2018 | Ho et al. | |
| 2018/0246557 A1* | 8/2018 | John | G06F 1/3206 |
| 2019/0229736 A1* | 7/2019 | Kosonocky | H03K 5/14 |
| 2019/0265767 A1* | 8/2019 | Mehra | G06F 1/324 |
| 2019/0317546 A1* | 10/2019 | Born | G06F 1/08 |
| 2020/0019224 A1 | 1/2020 | Chuang et al. | |
| 2020/0272220 A1 | 8/2020 | Mosalikanti et al. | |
| 2020/0310516 A1* | 10/2020 | Webel | G06F 1/28 |
| 2021/0034084 A1 | 2/2021 | Zou | |
| 2022/0164250 A1 | 5/2022 | Biran et al. | |
| 2022/0166431 A1 | 5/2022 | Shor et al. | |
| 2023/0025355 A1* | 1/2023 | Spica | G11C 29/028 |
| 2023/0067178 A1 | 3/2023 | Liu et al. | |
| 2023/0176645 A1* | 6/2023 | Wu | G06F 1/3296 |
| 2024/0036631 A1* | 2/2024 | Ma | H04W 76/30 |

OTHER PUBLICATIONS

Allison et al., "Voltage Droop Controls in Power Flow Simulation," IEEE, 2019, 6 pages.

Dirican et al., "A Droop Measurement Built-in Self-Test Circuit for Digital Low-Dropout Regulators, " 19th International Symposium on Quality Electronic Design, 2018, 6 pages.

Meng et al., "A Generalized Droop Control for Grid-Supporting Inverter Based on Comparison Between Traditional Droop Control and Virtual Synchronous Generator Control," IEEE Transactions on Power Electronics, vol. 34, No. 6, Jun. 2019, pp. 5416-5438.

Kim et al., "A 67.1ps FOM, 0.5V-Hybrid Digital LDO with Asynchronous Feedforward Control via Slope Detection and Synchronous PI with State-based Hysteresis Clock Switching," IEEE Solid-State Circuits Letters, 2018, pp. 1-5.

Non-Final Office Action from U.S. Appl. No. 18/082,494, dated Feb. 28, 2024.

International Search Report and Written Opinion from PCT Application No. PCT/EP2023/084108, dated May 15, 2024, 23 pages.

* cited by examiner

| sl no | Throttle % | Workload Activity % | Proposed Pattern |
|---|---|---|---|
| 1 | 0.0000 | 100.0000 | 00000000000000000000000000000000 |
| 2 | 3.1250 | 96.8750 | 10000000000000000000000000000000 |
| 3 | 6.2500 | 93.7500 | 11000000000000000000000000000000 |
| 4 | 9.3750 | 90.6250 | 11100000000000000000000000000000 |
| 5 | 12.5000 | 87.5000 | 11110000000000000000000000000000 |
| 6 | 15.6250 | 84.3750 | 11111000000000000000000000000000 |
| 7 | 18.7500 | 81.2500 | 11111100000000000000000000000000 |
| 8 | 21.8750 | 78.1250 | 11111110000000000000000000000000 |
| 9 | 25.0000 | 75.0000 | 11111111000000000000000000000000 |
| 10 | 28.1250 | 71.8750 | 11111111100000000000000000000000 |
| 11 | 31.2500 | 68.7500 | 11111111110000000000000000000000 |
| 12 | 34.3750 | 65.6250 | 11111111111000000000000000000000 |
| 13 | 37.5000 | 62.5000 | 11111111111100000000000000000000 |
| 14 | 40.6250 | 59.3750 | 11111111111110000000000000000000 |
| 15 | 43.7500 | 56.2500 | 11111111111111000000000000000000 |
| 16 | 46.8750 | 53.1250 | 11111111111111100000000000000000 |
| 17 | 50.0000 | 50.0000 | 11111111111111110000000000000000 |
| 18 | 53.1250 | 46.8750 | 11111111111111111000000000000000 |
| 19 | 56.2500 | 43.7500 | 11111111111111111100000000000000 |
| 20 | 59.3750 | 40.6250 | 11111111111111111110000000000000 |
| 21 | 62.5000 | 37.5000 | 11111111111111111111000000000000 |
| 22 | 65.6250 | 34.3750 | 11111111111111111111100000000000 |
| 23 | 68.7500 | 31.2500 | 11111111111111111111110000000000 |
| 24 | 71.8750 | 28.1250 | 11111111111111111111111000000000 |
| 25 | 75.0000 | 25.0000 | 11111111111111111111111100000000 |
| 26 | 78.1250 | 21.8750 | 11111111111111111111111110000000 |
| 27 | 81.2500 | 18.7500 | 11111111111111111111111111000000 |
| 28 | 84.3750 | 15.6250 | 11111111111111111111111111100000 |
| 29 | 87.5000 | 12.5000 | 11111111111111111111111111110000 |
| 30 | 90.6250 | 9.3750 | 11111111111111111111111111111000 |
| 31 | 93.7500 | 6.2500 | 11111111111111111111111111111100 |
| 32 | 96.8750 | 3.1250 | 11111111111111111111111111111110 |
| 33 | 100.0000 | 0.0000 | 11111111111111111111111111111111 |

| Old pattern |
|---|
| 00000000000000000000000000000000 |
| 10000000000000001000000000000000 |
| 10000000000000001000000000000000 |
| 11000000000000001000000000000000 |
| 11000000000000001100000000000000 |
| 11100000000000001100000000000000 |
| 11100000000000001110000000000000 |
| 11110000000000001110000000000000 |
| 11110000000000001111000000000000 |
| 11111000000000001111000000000000 |
| 11111000000000001111100000000000 |
| 11111100000000001111100000000000 |
| 11111100000000001111110000000000 |
| 11111110000000001111110000000000 |
| 11111110000000001111111000000000 |
| 11111111000000001111111000000000 |
| 11111111000000001111111100000000 |
| 11111111100000001111111100000000 |
| 11111111100000001111111110000000 |
| 11111111110000001111111110000000 |
| 11111111110000001111111111000000 |
| 11111111111000001111111111000000 |
| 11111111111000001111111111100000 |
| 11111111111100001111111111100000 |
| 11111111111100001111111111110000 |
| 11111111111110001111111111110000 |
| 11111111111110001111111111111000 |
| 11111111111111001111111111111000 |
| 11111111111111001111111111111100 |
| 11111111111111101111111111111100 |
| 11111111111111101111111111111110 |
| 11111111111111111111111111111110 |
| 11111111111111111111111111111111 |

VOLTAGE DROOP AND OVERSHOOT MANAGEMENT USING NON-LINEAR SLOPE DETECTION

BACKGROUND

The present invention relates to processor core activity, and more specifically, this invention relates to management of voltage droop and overshoot through hardware calibrated non-linear slope detection.

A sudden change in processor-core activity results in a large delta-current drawn from the power-supply causing voltage droop due to inductive noise. If multiple cores in a single processor-chip were to change from low to high activity in a small interval of time, the voltage droop observed at all cores will be quite large. Droops that are too steep are dangerous to the health of the system and need to be controlled/mitigated. A throttling mechanism (slowing down processor activity) is used to mitigate dangerous droops.

In conventional systems, Digital Droop Sensors (DDS) are placed at various points in the processor to act as monitors of the voltage droops. However, there is a certain amount of delay (e.g., about 40 to 50 processor clock-cycles) from the time the activity change occurs to the point in time where the sensor responds to show the voltage droop event. This delay is crucial to maintain the system's reliability. If the voltage droop is too sharp, the throttling actuator will be late for mitigating the droop. Slope detectors that detect the rate of change in the voltage of a processor core were introduced to actuate early and mitigate sharp droop and/or overshoots.

However, voltage droop or overshoot due to sudden changes in processor activity affects the reliability of the system. Unfortunately, detection mechanisms in place in conventional systems are limited by being based on a certain threshold or by slope detection such that voltage droop or overshoot can escape and disrupt the system. Moreover, the manual calibration process for finding the appropriate setting for each core processor is not practical.

Currently, there are limitations to sensors for detecting voltage droop. The digital detector sensors (DDS) provide a digital "thermometer" of the current voltage level of a processing core. For example, 0 to 16 bins where each bin is 10 mW range and has been calibrated at bin 8=0.85 V. Moreover, conventional sensors employ the following detection mechanisms: a) a threshold-based mechanism, for example, throttle if DDS bin is below 4, and b) a slope-based mechanism, for example, throttle if DDS bin goes from X to Y in less than Z cycles.

One drawback of the current system is that there are situations that escape detection, or situations that are detected too late. For example, overshoot may be followed by a droop, which in turn generates a worse droop. In another example, there may be non-linear droops. In one such case, droops may be non-linear because the circuits are equivalent to RLC network which are non-linear. In another such case, the DDS response behavior may be non-linear. The DDS response is typically most accurate at its calibration bin and as the bin moves away from the calibration bin, the mV/bin resolution differs giving a non-linear response.

Another drawback of conventional systems to detect droop is the impractical calibration process. There are several parameters and slope settings to set each core, different processor, different voltage settings, etc. As a result, the current calibration process is conservative. In other words, the current calibration process tends to only cover the worst case while penalizing other cases.

Key parameters of a dangerously steep droop signature may be provided as the parameters for slope-based droop management approach. During a workload run, whenever the slope detector detects a similar signature (e.g., high-edge, low-edge, width), a throttle signal may be triggered, and cores may be throttled until the droop is under control and slowly the throttle is released.

However, it has been challenging to arrive at the right slope settings/droop signature. The manual assessment of each chip/core is cumbersome. For example, each chip/core needs to be analyzed and droop is characterized, and then a common slope setting is determined, e.g., a universal slope setting. The appropriate settings need to mitigate the droop effectively and should not throttle too often to affect the performance; and these settings must be satisfied in all cores/chips. Unfortunately, a common setting may not be fool proof and, at times, dangerous droops escape and the system gets into check stop (i.e., failure).

For example, in zThemis characterization, a universal slope setting is obtained by taking critical path monitor (CPM) traces on selected chips and by visually checking the slopes. Then, manual settings are derived that are expected to satisfy all the chips throttling, however, this solution tends to over-throttle fast chips and under-throttle slow chips. Thus, there is a need for custom slope settings for each core/chip.

In slope detection, for different individual cores, there can be a significant difference in the number of cycles needed to reach from high CPM bin to low CPM bin. For example, in a zThemis system, the CPM setting may be configured in each core, but the settings were limited by design infrastructure (VPD). There is a need for flexibility in configuration of the CPM settings for the core/chip.

Furthermore, when a throttle is induced, the throttle pattern influences the power management, and so a fixed pattern of the throttle-release approach is not efficient. There is a need for a configurable throttle pattern.

SUMMARY

A computer-implemented method, in accordance with one aspect of the present invention, is for detecting n-level slopes for a voltage level in a processor, wherein n is greater than 1. The method includes monitoring a voltage in a processor for a voltage level corresponding to a predefined first edge, and monitoring for a voltage level corresponding to a predefined second edge within a first count limit from detection of the predefined first edge. In response to detecting the predefined second edge within the first count limit, the computer-implemented method includes monitoring for a voltage level corresponding to a predefined third edge within a second count limit from detection of the predefined second edge, and in response to detecting the predefined third edge within the second count limit, determining whether to adjust a power applied to the processor based on the monitored voltage levels.

As a solution to the problems noted above, the method provides detection and management of non-linear slopes during processor activity. The n-level slope detection (where n is greater than 1) allows early detection of changes in processor activity and mitigation of sharp drops and/or overshoots that otherwise would escape detection.

A computer-program product, in accordance with one aspect of the present invention, for detecting n-level slopes for a voltage level in a processor, wherein n is greater than 1, includes one or more computer readable storage media, and program instructions collectively stored on the one or more computer readable storage media. The program instructions include program instructions to perform the foregoing method.

A system, in accordance with one aspect of the present invention, includes a processing circuit where the circuit comprises an n-level slope detector, n being greater than 1, where the n-level slope detector comprises a voltage sensor; and logic integrated with the processing circuit, executable by the processing circuit, or integrated with and executable by the processing circuit. The logic is configured to perform the foregoing method.

In some approaches, in response to not detecting a predefined second edge within the first count limit, the method is restarted at the beginning of the method by monitoring for a predefined first edge.

In some approaches, an n-level slope detector where n is greater than 2 monitors for predefined edges, detects a non-linear, a greater than 2 level slope, and adjusts the power accordingly. For example, an overshoot followed by a droop is detected and the power is adjusted according specifically to the non-linearity of the slope.

A computer-implemented method, in accordance with one aspect of the present invention, using a slope trace based on voltage levels of a processor includes detecting a plurality of slopes using a slope trace and storing data from the plurality of slopes in a log. The data includes a minimum count and a maximum count for a transition between a predefined high edge and a predefined low edge for each of the detected plurality of slopes. The computer-implemented method includes selecting a configuration for a slope detector based on a set of data from the plurality of slopes, wherein the selection includes a maximum count below a predefined count threshold.

A slope-based management approach provides detection of key parameters of a dangerously steep droop signature using a slope trace method as described thereby providing solutions to the problems noted above including failure to anticipate dangerously steep droop patterns.

A computer-implemented method, in accordance with one aspect of the present invention, for calibration of a slope detector based on a processor having the slope detector includes repeating for the following operations for a plurality of power cycles: increasing power on the processor for a predefined duration of time, recording a minimum count and a maximum count between a high edge and a low edge detected while monitoring a voltage level applied to a processor during the increasing the power, and applying a throttle. Data of each of the plurality of power cycles is stored, the data including voltage levels at each high edge and low edge, and the maximum count during transition from each high edge to each low edge, respectively. A set of cycles is selected from the plurality of power cycles. The set of cycles have high edge-low edge combinations corresponding to a predefined difference in voltage levels. The computer-implemented method includes programming the slope detector on the processor with a configuration corresponding to data of one of the selected set of cycles having a minimum value of the maximum count in the transition between the high edge and the low edge.

The method for automatic calibration of a slope detector solves the problem, as noted above, of inefficiency and inaccuracy of common settings that accompany conventional manual assessments of each chip/core. Moreover, the calibration method as described herein allows re-calibration of the slope detector using slope trace.

Other aspects and approaches of the present invention will become apparent from the following detailed description, which, when taken in conjunction with the drawings, illustrate by way of example the principles of the invention.

BRIEF DESCRIPTION OF THE DRAWINGS

FIG. 8 depicts a set of throttle configurations based on a type of processor, in accordance with one inventive aspect of the present invention. Part (a) is a configuration having 32 throttle levels, and part (b) is a configuration having 16 throttle levels.

DETAILED DESCRIPTION

Figure 1:
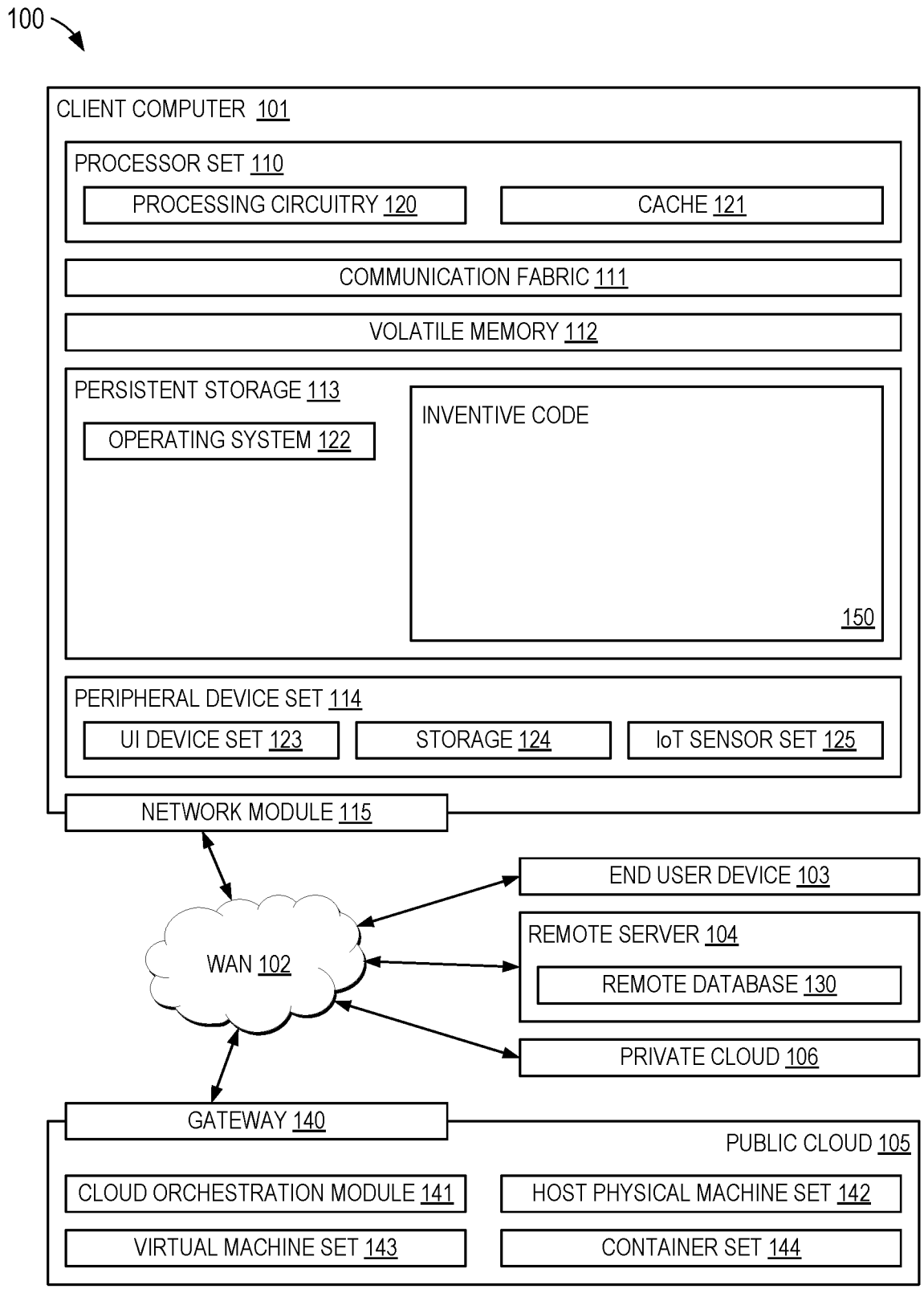
FIG. 1 is a diagram of a computing environment, in accordance with one inventive aspect of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred inventive aspects of systems, methods and computer program products for management of voltage droop and voltage overshoot using non-linear slope detection.

In one general inventive aspect, a computer-implemented method for detecting n-level slopes for a voltage level in a processor, wherein n is greater than 1, includes monitoring a voltage in a processor for a voltage level corresponding to a predefined first edge, and monitoring for a voltage level corresponding to a predefined second edge within a first count limit from detection of the predefined first edge. In response to detecting the predefined second edge within the first count limit, the computer-implemented method includes monitoring for a voltage level corresponding to a predefined third edge within a second count limit from detection of the predefined second edge, and in response to detecting the predefined third edge within the second count limit, determining whether to adjust a power applied to the processor based on the monitored voltage levels.

In another general inventive aspect, a computer-program product for detecting n-level slopes for a voltage level in a processor, wherein n is greater than 1, includes one or more computer readable storage media, and program instructions collectively stored on the one or more computer readable storage media. The program instructions include program instructions to perform the foregoing method.

In another general inventive aspect, a system includes a processing circuit where the circuit comprises an n-level slope detector, n being greater than 1, where the n-level slope detector comprises a voltage sensor; and logic integrated with the processing circuit, executable by the processing circuit, or integrated with and executable by the processing circuit. The logic is configured to perform the foregoing method.

In yet another general inventive aspect, a computer-implemented method using a slope trace based on voltage levels of a processor includes detecting a plurality of slopes using a slope trace and storing data from the plurality of slopes in a log. The data includes a minimum count and a maximum count for a transition between a predefined high edge and a predefined low edge for each of the detected plurality of slopes. The computer-implemented method includes selecting a configuration for a slope detector based on a set of data from the plurality of slopes, wherein the selection includes a maximum count below a predefined count threshold.

In another general inventive aspect, a computer-implemented method for calibration of a slope detector based on a processor having the slope detector includes repeating for the following operations for a plurality of power cycles: increasing power on the processor for a predefined duration of time, recording a minimum count and a maximum count between a high edge and a low edge detected while monitoring a voltage level applied to a processor during the increasing the power, and applying a throttle. Data of each of the plurality of power cycles is stored, the data including voltage levels at each high edge and low edge, and the maximum count during transition from each high edge to each low edge, respectively. A set of cycles is selected from the plurality of power cycles. The set of cycles have high edge-low edge combinations corresponding to a predefined difference in voltage levels. The computer-implemented method includes programming the slope detector on the processor with a configuration corresponding to data of one of the selected set of cycles having a minimum value of the maximum count in the transition between the high edge and the low edge.

A list of acronyms used in the description is provided below.

ASIC application specific integrated circuit
CD-ROM compact disc read-only memory
CPP computer program product
CPM critical path monitor
CPU central processing unit
DDS digital droop sensor
DVD digital versatile disk
EPROM erasable programmable read-only memory
EUD end user device
FPGA field programmable gate array
GPU graphics processing unit
HDD hard disk drives
IC integrated circuit
I/O input/output
IoT Internet of Things
LAN local area network
NFC Near-Field Communication
NVM nonvolatile memory
PME power management engine
RAM random access memory
ROM read-only memory
SAN storage area network
SD secure digital
SDN software-defined networking
SRAM static random access memory
SSD solid state drive
UI user interface
USB universal serial bus
VCE virtual computing environment
WAN wide area network Various aspects of the present disclosure are described by narrative text, flowcharts, block diagrams of computer systems and/or block diagrams of the machine logic included in computer program product (CPP) inventive aspects. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product inventive aspect ("CPP inventive aspect" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as an n-level slope detector, where n is greater than 1, of block 150. In addition to block 150, computing environment 100 includes, for example, computer 101, wide area network (WAN) 102, end user device (EUD) 103, remote server 104, public cloud 105, and private cloud 106. In this inventive aspect, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various inventive aspects, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some inventive aspects, storage 124 may take the form of a quantum computing storage device for storing data in the form of qubits. In inventive aspects where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some inventive aspects, network control functions and network forwarding functions of network module 115 are performed on the same physical hardware device. In other inventive aspects (for example, inventive aspects that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some inventive aspects, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some inventive aspects, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other inventive aspects a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this inventive aspect, public cloud 105 and private cloud 106 are both part of a larger hybrid cloud.

In some aspects, a system according to various inventive aspects may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Figure 2:
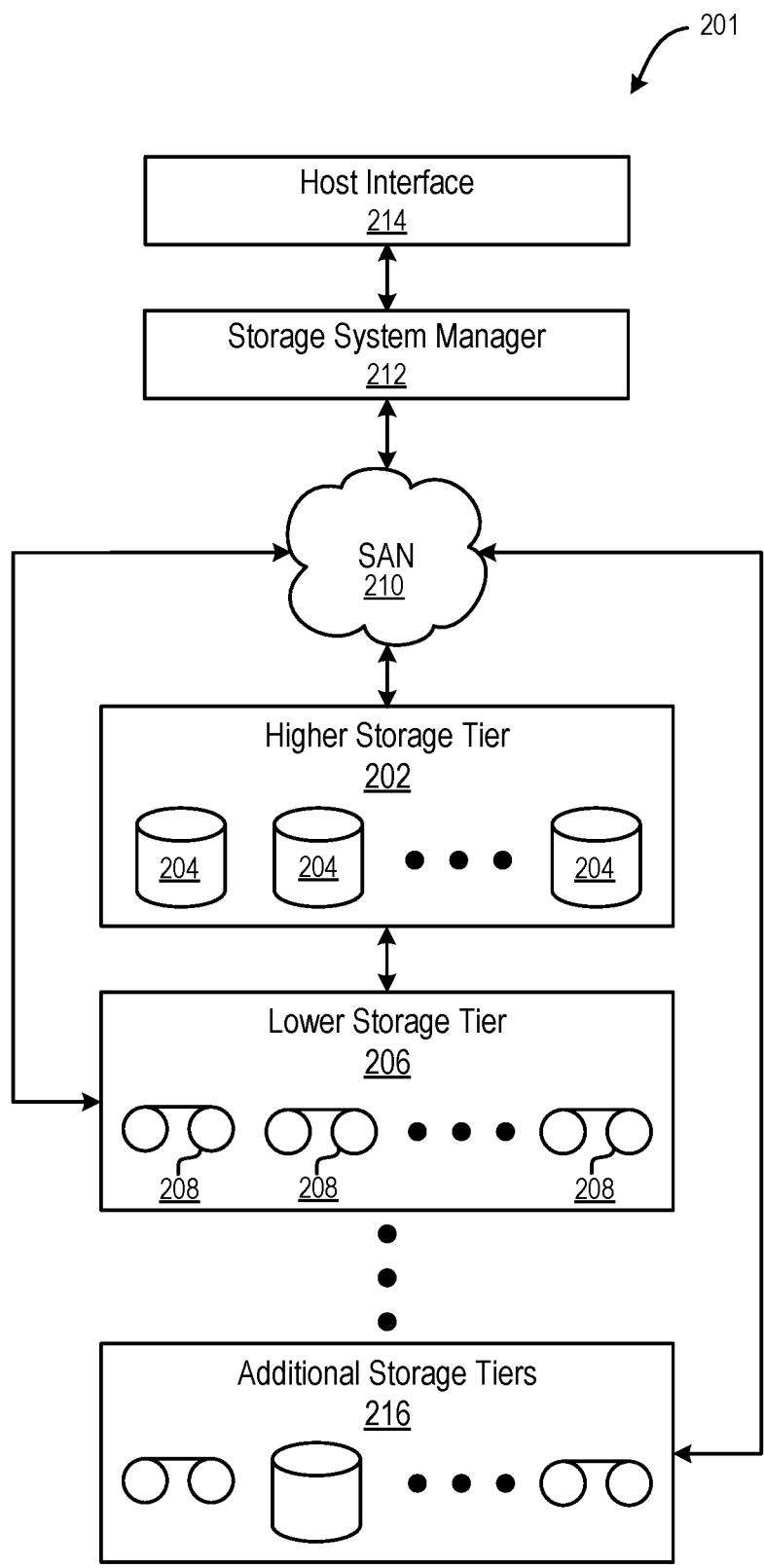
FIG. 2 is a diagram of a tiered data storage system, in accordance with one inventive aspect of the present invention.

Now referring to FIG. 2, a storage system 201 is shown according to one inventive aspect. Note that some of the elements shown in FIG. 2 may be implemented as hardware and/or software, according to various inventive aspects. The storage system 201 may include a storage system manager 212 for communicating with a plurality of media and/or drives on at least one higher storage tier 202 and at least one lower storage tier 206. The higher storage tier(s) 202 preferably may include one or more random access and/or direct access media 204, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 206 may preferably include one or more lower performing storage media 208, including sequential access media such as magnetic tape in tape drives and/or optical media, slower accessing HDDs, slower accessing SSDs, etc., and/or others noted herein or known in the art. One or more additional storage tiers 216 may include any combination of storage memory media as desired by a designer of the system 201. Also, any of the higher storage tiers 202 and/or the lower storage tiers 206 may include some combination of storage devices and/or storage media.

The storage system manager 212 may communicate with the drives and/or storage media 204, 208 on the higher storage tier(s) 202 and lower storage tier(s) 206 through a network 210, such as a storage area network (SAN), as shown in FIG. 2, or some other suitable network type. The storage system manager 212 may also communicate with one or more host systems (not shown) through a host interface 214, which may or may not be a part of the storage system manager 212. The storage system manager 212 and/or any other component of the storage system 201 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more inventive aspects, the storage system 201 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 202, may include a majority of SSD storage media for storing data in a higher performing storage environment, and remaining storage tiers, including lower storage tier 206 and additional storage tiers 216 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 202, while data not having one of these attributes may be stored to the additional storage tiers 216, including lower storage tier 206. Of course, one of skill in the art, upon reading the present descriptions, may devise many other combinations of storage media types to implement into different storage schemes, according to the inventive aspects presented herein.

According to some inventive aspects, the storage system (such as 201) may include logic configured to receive a request to open a data set, logic configured to determine if the requested data set is stored to a lower storage tier 206 of a tiered data storage system 201 in multiple associated portions, logic configured to move each associated portion of the requested data set to a higher storage tier 202 of the tiered data storage system 201, and logic configured to assemble the requested data set on the higher storage tier 202 of the tiered data storage system 201 from the associated portions.

Of course, this logic may be implemented as a method on any device and/or system or as a computer program product, according to various inventive aspects.

According to one inventive aspect, a solution to detecting sudden changes in processor activity is a system that operates as a non-linear slope detector. In one approach, non-linear droops or overshoots of a processor core may be detected using an n-level slope detector, where n is greater than 1, and a configurable process for adjusting power to the processor.

Figure 3:
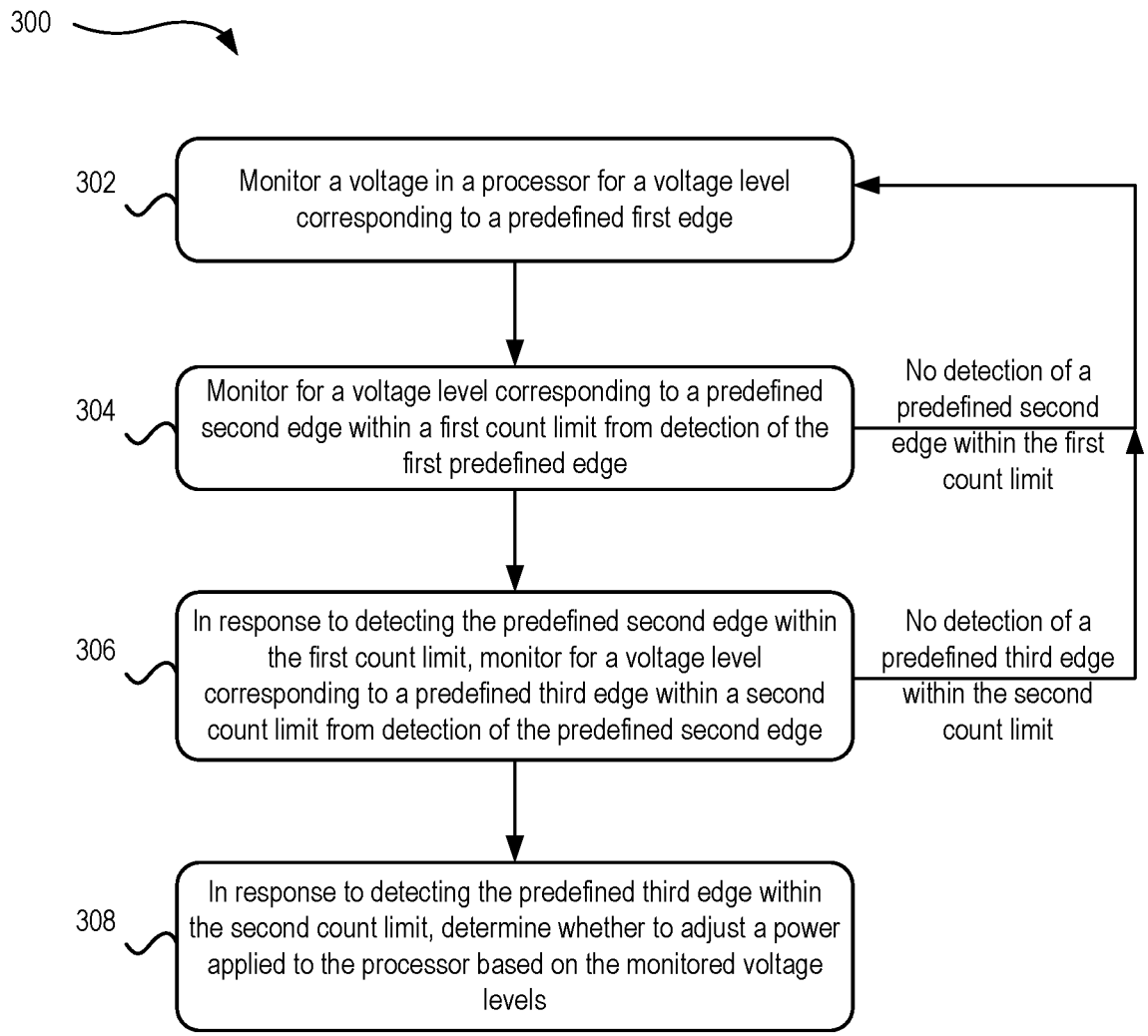
FIG. 3 is a flowchart of a method for detecting n-level slopes, in accordance with one inventive aspect of the present invention.

Now referring to FIG. 3, a flowchart of a method 300 is shown, according to one inventive aspect. The method 300 may be performed in accordance with the present invention in any of the environments depicted in FIGS. 1-8, among others, in various inventive aspects. Of course, more or fewer operations than those specifically described in FIG. 3 may be included in method 300, as would be understood by one of skill in the art upon reading the present descriptions.

Each of the steps of the method 300 for detecting n-level slopes for a voltage level in a processor, where n is greater than 1, may be performed by any suitable component of the operating environment. For example, in various inventive aspects, the method 300 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 may initiate with operation 302 comprising monitoring a voltage in a processor for a voltage level corresponding to a predefined first edge. The monitoring may be performed by an n-level slope detector where n is an integer greater than 1. The slope detector comprises a voltage sensor for monitoring the voltage levels. In one approach, the slope detector may have an onboard voltage sensor. In another approach, the monitoring includes receiving readings from a voltage sensor located at an appropriate location in the processor chip, e.g., along a power supply line, at each core, etc. The readings may be relative voltage values according to the configuration of the type of sensor. For example, one type of sensor may provide a range of voltage levels from 0 to 24, another type of sensor may provide a range of voltage levels from 0 to 16, etc. In one exemplary approach, the voltage sensor may be functional as a digital droop sensor (DDS).

Operation 304 includes monitoring for a voltage level corresponding to a predefined second edge within a first count limit from detection of the predefined first edge. In one approach, a first count may be limited to a predefined number of cycles, clock cycles, etc. For example, a two-level slope detector is configured with a predefined first edge and a predefined second edge and a first count limit of the maximum number of cycles in the transition between the predefined first edge and the predefined second edge. Each predefined edge and each count limit are configured for the n-level slope detector according to the processor. In one approach, each predefined edge and each count limit may be configured according to the processing behavior of the processor.

The monitoring for a voltage level may correspond to detecting an n-level of non-linearity. For example, each non-linear section (e.g., slope) corresponds to first and second predefined edges and a count limit of the transition between the first edge and the second edge. For example, an n-level slope detector may detect a change in voltage levels that comprises a two level slope (n=2) that detects two levels of non-linearity in a voltage change, and thus the n-level slope detector monitors for three predefined edges: a first edge, a second edge, and a third edge. In another example, an n-level slope detector may detect a change in voltage levels that comprises a three level slope (n=3) where there are three levels of non-linearity, and thus the n-level slope detector monitors for four predefined edges: a first edge, a second edge, a third edge, and a fourth edge. In various approaches, a predefined first edge, a predefined second edge, a predefined n+1 edge, etc. are configured relative voltage values (e.g., high edge or low edge) that indicate a threshold of a relative value of the voltage level during a change in power having a n-level of non-linearity. The monitored voltage level may be above, below, in a range, etc. of the predefined edge.

In one example, and not meant to be limiting in any way, the voltage levels of a chip vary back and forth from 0.9 volts to 1.0 volts, a first edge may be configured to be 0.98 and a second edge 0.95, and the first count limit is configured as 10 (e.g., 10 cycles between the first edge and the second edge). If the voltage changes from 0.98 to 0.95 within 10 cycles, the voltage detector detects a voltage droop. The sensor inputting the voltage levels provides the voltage level in a digital form of the voltage, e.g., level of bin. The sensor is giving out a value that is equivalent to a voltage level.

In response to detecting a predefined second edge within the first count limit, operation 306 includes monitoring for a voltage level corresponding to a predefined third edge within a second count limit from detection of the predefined second edge. The detection of a predefined second edge within the first count limit results in a detection of a first slope. In turn, detecting a first slope triggers the monitoring for the next predefined edge, e.g., the predefined third edge, that will determine a second slope if the next predefined edge is detected within the second count limit. As defined for a first count limit, a second count limit, n level count limit, etc. may be a predefined number of cycles, e.g., clock cycles, where the count is initiated in response to detecting the voltage level corresponding to a respective first edge. The first count limit may be different form the second count limit. For example, the first count limit may be 10 cycles and the second count limit may be 5 cycles.

In one approach, in response to detecting a predefined second edge within the first count limit, e.g., the first slope, the method may include adjusting the power to the system. For example, a small amount of pro-active throttling to the system may be initiated as operation 306 is monitoring for a voltage level corresponding to a predefined third edge within a second count limit.

Figure 4A:
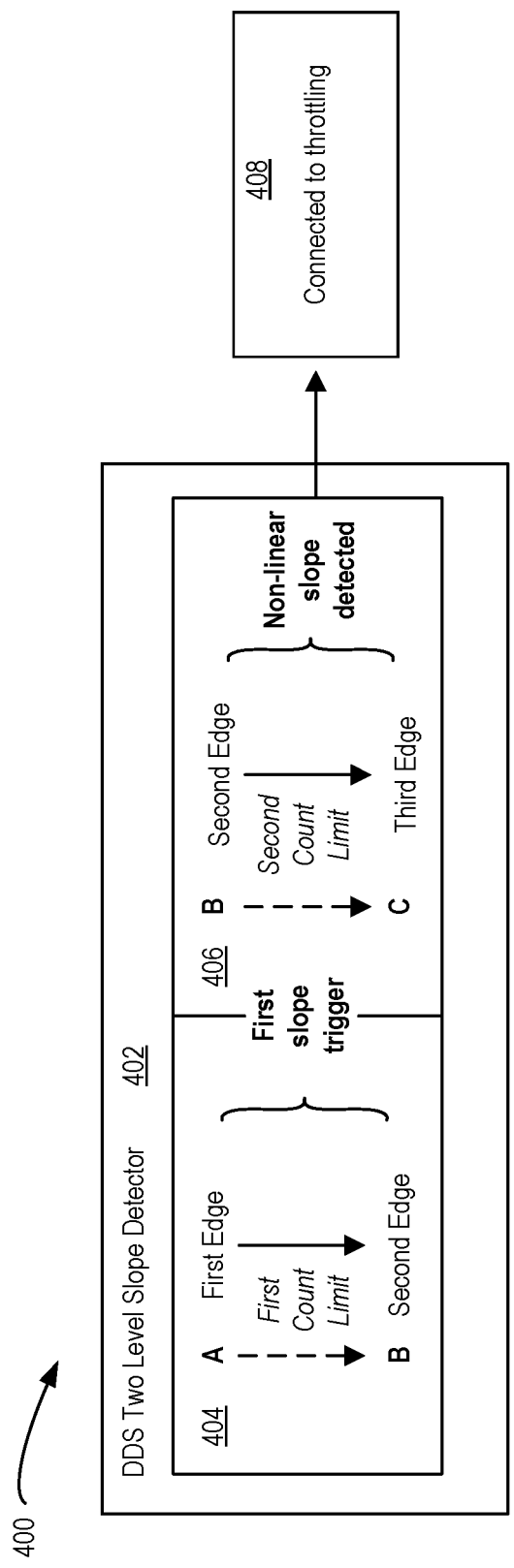
FIG. 4A is a schematic diagram of a n-level slope detector, in accordance with one inventive aspect of the present invention.

One example of the method 300 is illustrated in a system 400 of managing power of a processor in the schematic drawing in FIG. 4A. FIG. 4A depicts a system 400, in accordance with one inventive aspect. As an option, the present system 400 may be implemented in conjunction with features from any other inventive aspect listed herein, such as those described with reference to the other FIGS. Of course, however, such system 400 and others presented herein may be used in various applications and/or in permutations which may or may not be specifically described in the illustrative inventive aspects listed herein. Further, the system 400 presented herein may be used in any desired environment.

As illustrated in FIG. 4A as an example only, a two level non-linear slope detector 402 monitors the relative voltage levels of the processor. The system 400 begins with detecting a first slope 404 (e.g., a single level). Using a sensor, a relative voltage level A is monitored corresponding to a first edge. The sensor may be a DDS positioned on a processor. The first edge is a predefined value (e.g., a configured relative voltage threshold) that indicates a change in voltage over the processor. In one approach, the first edge may be configured as a high edge. In another approach, the first edge may be configured as a low edge.

The slope detector 402 continues to monitor for a voltage level B corresponding to a predefined second edge within a first count limit (solid arrow). In one approach, the value of the first count limit is configured according to the maximum count (e.g., clock cycles) that may represent a voltage droop, overshoot, undershoot, etc. In response to the count (dashed line) of cycles from the monitored voltage level A in transition to the monitored voltage level B being within the first count limit, a first slope is detected. Detection of the first slope triggers the detection of a second slope 406 that includes monitoring for a relative voltage level C corresponding to a predefined third edge. Detection of the second slope 406 corresponds to the count (dashed line) from the monitored voltage level B at the second edge to the monitored voltage level C at the predefined third edge, where the count is within a second count limit (solid arrow). In response to the detection of a second slope, a non-linear slope is detected.

Referring back to method 300 in FIG. 3, operation 308 includes, in response to detecting the predefined third edge within the second count limit, determining whether to adjust a power applied to the processor based on the monitored voltage levels to mitigate the effects of the voltage change(s) on the processor. In one approach, power controller may determine whether to adjust a power applied to the processor. In one approach, operation 308 may determine how to adjust the power applied to the processor on the monitored voltage levels corresponding to the detected edges to mitigate the effects of the voltage change(s) on the processor.

In one approach, the power may be adjusted by throttling the processing activity to reduce the power applied to one or more cores of the processor. The power may be adjusted by throttling the processing activity to reduce the power consumed by the one or more cores of the processor. The adjustment of the power by throttling may be based on the shape of the linearity of the slope detected by the n-level slope detector. For example, a detected non-linear slope having a shape of a voltage droop may have the power adjusted by throttling the processing activity to reduce the power consumed by the one or more processing cores.

In another example, mitigation of the voltage may include throttling of the code, for example, suspending the instructions which are executing the code, for a short period of time until the voltage droop is recovered. If the throttling of the voltage is carried out too often, too much, etc. then the performance of the core will be compromised because the instructions have been suspended too often. It is desirable that the core recovers from the voltage droop without excessive effect on the core performance. In preferred approaches, the inventive aspects described herein provide management of the voltage droop and mitigation of the voltage for optimal core performance.

In another approach, the power may be adjusted by increasing the power applied to the processor. For example, an increase in voltage may be applied to the processor, frequency may be increased, etc. In current technology, with the use of lower nodes, and the limits of maximum voltage for newer processors, an increasingly prevalent issue is an outage resulting in an overshoot. An overshoot being similar to voltage droop but having an opposite effect on the processing core. During a very high activity, there is suddenly no activity, e.g., there is no demand for the current, so the voltage increases.

As illustrated in the example system 400 of FIG. 4A, the two level slope detector 402 may be connected to a throttling mechanism 408 for adjusting a power applied to the processor based on the monitored voltage levels to mitigate the effects of the voltage changes on the processor.

In one inventive aspect, the non-linear slope detector, e.g., an n-level slope detector where n is greater than 1, allows detection of any one of a series of outcomes caused by a change in voltage levels. In one approach of operation 308 of method 300, after detecting the predefined third edge within the second count limit, a shape of a non-linear slope is detected, the non-linear slope comprising the voltage levels detected at the predefined first edge, the predefined second edge, and the predefined third edge, where the power is adjusted based on the detected shape of the non-linear slope.

Figure 4B:
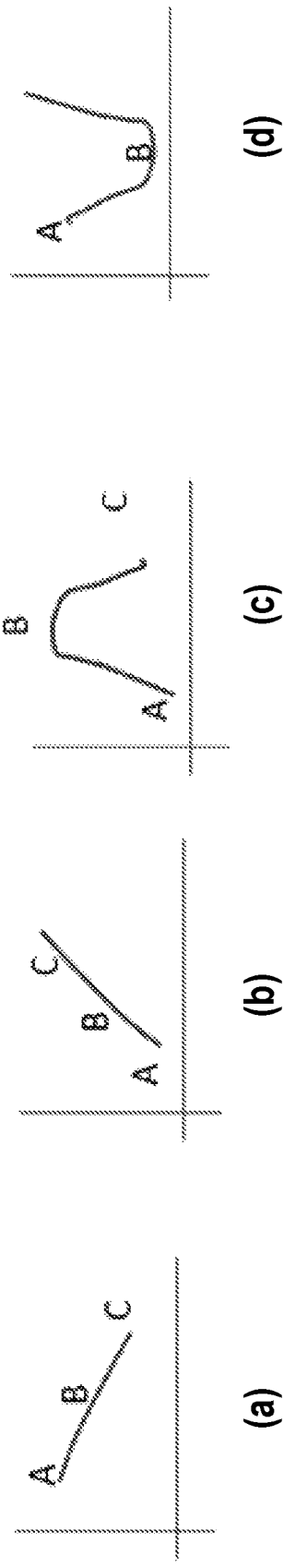
FIG. 4B is a series of shapes depicting different slopes detected by an n-level slope detector, in accordance with one inventive aspect of the present invention. Part (a) represents a non-linear undershoot slope, part (b) represents a non-linear overshoot slope, part (c) represents an overshoot followed by an undershoot, and part (d) represents an undershoot followed by an overshoot.

Referring to the two level slope detector as illustrated in FIG. 4A, a series of properties may be described according to the monitored voltage values of A, B, and C as follows. The plots depicted in FIG. 4B represent shapes of selected properties listed below.

1. No rule of A>B>C, such that each monitored voltage level A, B, C are within the operating relative voltage level range, e.g., the DDS bin range;
2. If A>B>C, a non-linear undershoot slope is detected, as shown in part (a);
3. If C>B>A, a non-linear overshoot slope is detected, as shown in part (b);
4. If A<B, B>C, an overshoot followed by undershoot is detected, as shown in part (c);
5. If A>B<C, an undershoot followed by an overshoot is detected, as shown in part (d);
6. If A=B or B=C, then normal linear slope is detected;
7. Slope detection happens when A→B→C happens within count limits;
8. Slope tracing may be enabled when slope is detected;
9. If monitoring remains in B and times out, the mechanism resets, and the process restarts at A again.

Referring back to method 300 of FIG. 3, in response to not detecting a predefined second edge within the first count limit, the method is restarted at operation 302 of monitoring for a voltage level corresponding to a predefined first edge. Moreover, in response to not detecting a predefined third edge within a second count limit as described in operation 306, the method is restarted at operation 302 of monitoring for a voltage level corresponding to a predefined first edge. At any time during the slope detection or running the processor, if a slope is not detected, e.g., a second edge is not detected within a predefined count limit after detection of a first edge, the method restarts with monitoring for a first edge.

The advantages of a non-linear universal slope detector include detection of slopes that represent combinations of changes in voltage levels during processing activity. These combinations include:
 a) Detection of undershoot voltage slope and mitigation A>B>C,
 b) Detection of overshoot voltage slope detection and mitigation A<B<C,
 c) Detection of overshoot followed by undershoot and mitigation A<B>C,
 d) Detection of undershoot followed by overshoot and mitigation A>B<C,
 e) Detection of linear slope, if A=B or B=C, this can be either overshoot or undershoot.

According to one inventive aspect, a processor includes a slope tracing logic in the hardware of the apparatus to profile the voltage droops or overshoots. In one approach, the system for detecting non-linear slopes provides slope detection for slope tracing logic. The slope tracing logic enables the behavior of the application, workload, etc. that is running on the processor.

According to one inventive aspect, a system includes a power management engine (PME) that is a controller associated with the processor and is programmable. The PME may create a matrix of parameters that include a combination of the values of a predefined first edge (e.g., high edge-bin value), a predefined second edge (e.g., low edge-bin value), a counter limit (e.g., minimum count of cycles). The PME may decide, determine, etc. the combination of the parameters to be used for slope detection for a specific core. The PME controls the slope detection, reads the slope trace, calibrates the slope detector, reprograms the slope detector, etc. The PME is programmed to read slope data and store the data in its memory.

Figure 5:
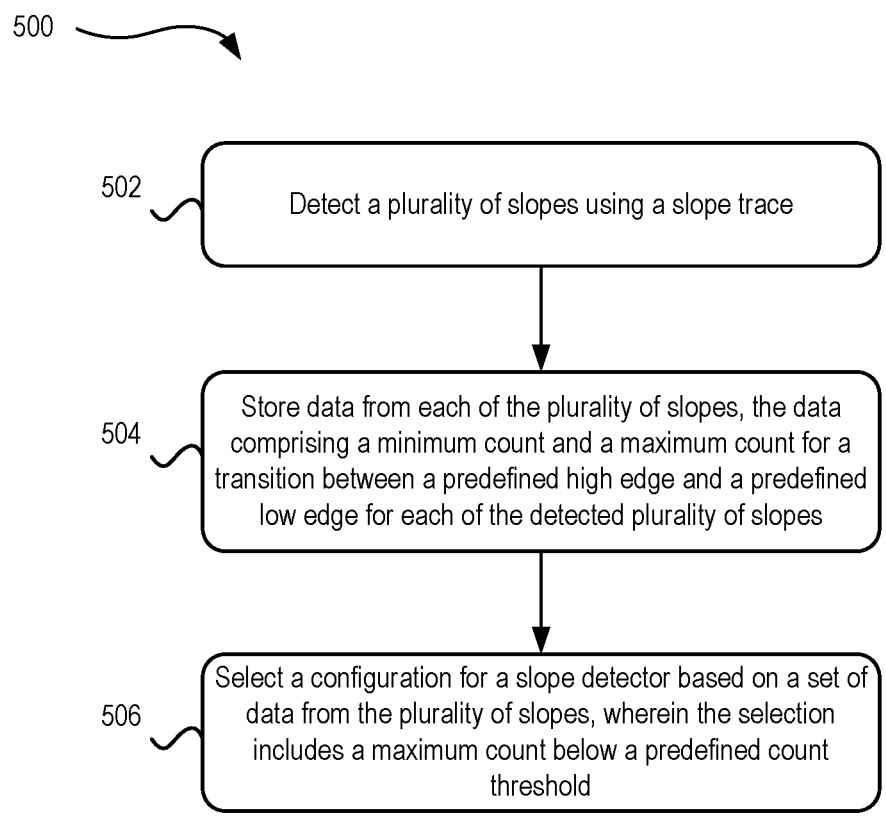
FIG. 5 is a flowchart of a method for creating a slope trace, in accordance with one inventive aspect of the present invention.

Now referring to FIG. 5, a flowchart of a method 500 for using a slope trace to select a configuration of a slope detector is shown, according to one inventive aspect. The method 500 may be performed in accordance with the present invention in any of the environments depicted in FIGS. 1-8, among others, in various inventive aspects. Of course, more or fewer operations than those specifically described in FIG. 5 may be included in method 500, as would be understood by one of skill in the art upon reading the present descriptions.

Each of the steps of the method 500 for using a slope trace may be performed by any suitable component of the operating environment. For example, in various inventive aspects, the method 500 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502 comprising detecting a plurality of slopes using a slope trace. Detecting each of the plurality of slopes incudes logic similar to method 300 (in FIG. 3) of detecting non-linear slopes during processing activity. In one approach, the logic between slope tracing process and slope detector process may be shared. The detecting of each of the plurality of slopes includes monitoring for a voltage level corresponding to a predefined high edge, monitoring for a voltage level corresponding to a predefined low edge within a first count limit, and for the plurality of slopes, capturing a minimum count and a maximum count during a transition between the predefined high edge and the predefined low edge. Over a given period of time, a minimum and maximum count between a predefined high edge and a predefined low edge are captured during a plurality of transitions between the predefined high edge and the predefined low edge.

Operation 504 includes storing data from the plurality of slopes in a log, the data comprising the minimum count and the maximum count for a transition between a predefined high edge and a predefined low edge for each of the detected plurality of slopes. For a plurality of slopes during a given period of time, a plurality of transitions generates a minimum count and a maximum count between a predefined high edge and a predefined low edge. For example, the slope trace logic also captures each minimum count between the high edge and the low edge (e.g., for a count limit of 10 cycles, a minimum count may be 5) and the logic captures a maximum count between the high edge and the low edge (e.g., for a count limit of 10 cycles, a maximum count may be 12 cycles) as counted between relative voltage levels, e.g., from A/B/C point in the detection. In addition, the slope trace logic stores a log of the minimum count and the maximum count detected during transition between the respective edges (e.g., configured bins).

In addition, a slope trace logic may capture a minimum relative voltage (e.g., a DDS min bin). The slope trace logic assesses the data of the plurality of slopes and determines whether an average minimum relative voltage level (e.g., DDS bin detected) of the plurality of slopes is relevant to the predefined low edge. If the average minimum relative voltage level is different from the low edge, the slope trace logic records the average minimum relative voltage level as a next predefined low edge. A predefined low edge may be re-defined according to a pre-programmed high-low edge based on a DDS min bin.

Operation 506 includes selecting a configuration for a slope detector based on a set of data from the plurality of slopes. In a preferred approach, the selection includes a maximum count below a predefined count threshold. In various approaches, the operations of method 500 may be performed by a power management engine associated with the processor.

Figure 6:
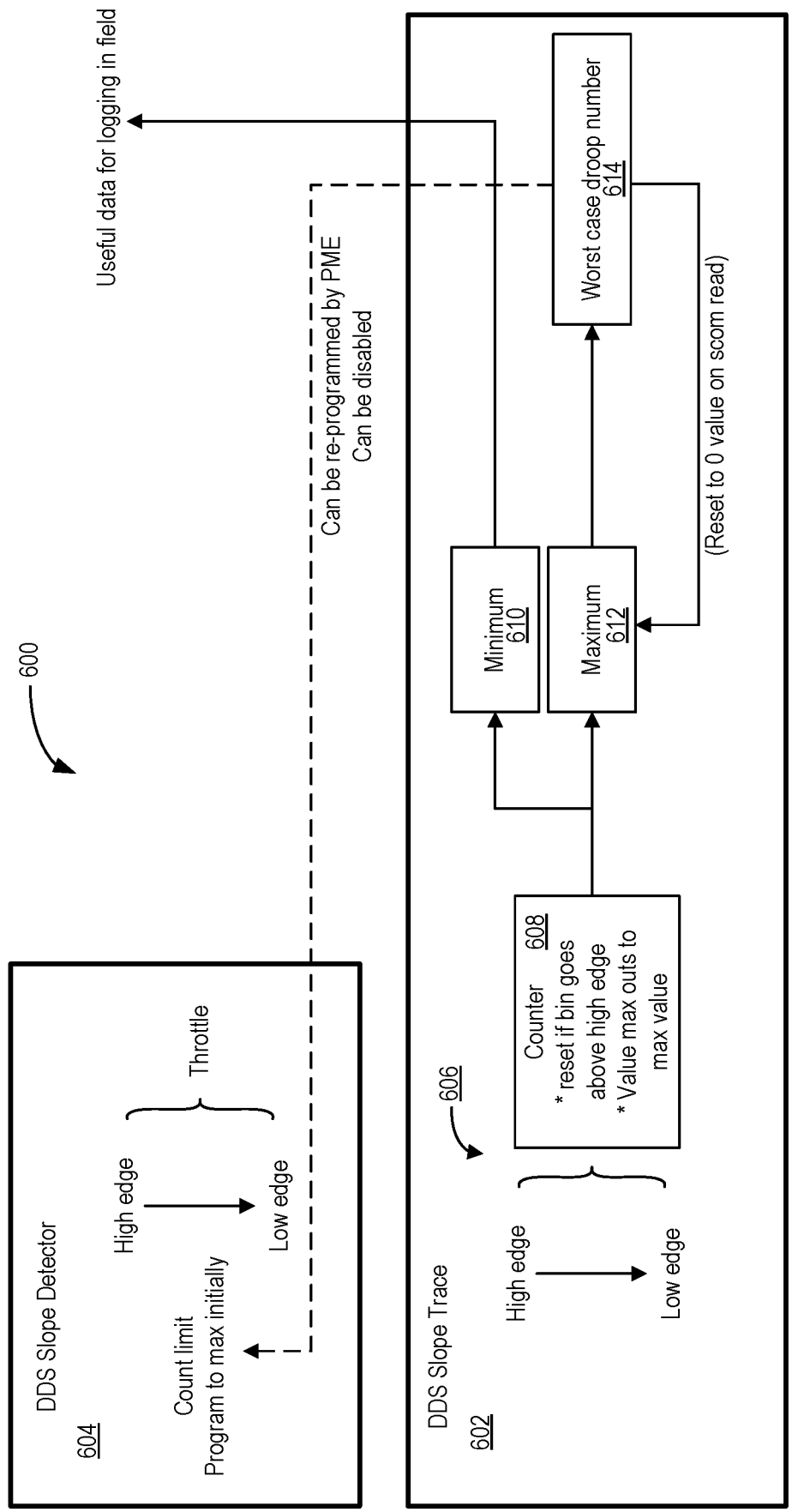
FIG. 6 is a schematic diagram of a system that includes creating a slope trace, in accordance with one inventive aspect of the present invention.

FIG. 6 illustrates a schematic drawing of a system 600 that includes a method 602 for using a slope trace to configure a slope detector 604, according to one aspect of the invention. The slope trace counts a number of cycles in the transition between the predefined high edge to the predefined low edge. As shown for the method 602 for using a slope trace, logic for detecting a plurality of slopes 606 to the logic may be similar to the logic detecting a slope (see 404 in FIG. 4A). The logic for detecting a plurality of slopes 606 may include for each detected slope capturing a count (solid arrow) between a high edge and low edge of relative voltage levels.

The slope trace method 602 may include instructions for a counter 608 for determining the number of cycles, count of cycles, during the transition from the first edge (e.g., high edge) to the second edge (e.g., low edge). The counter 608 may be reset if the voltage level (e.g., bin) goes above the high edge. The counter 608 may be configured to have a value max outs to max value. For example, a counter has N bits. If the processor cycles taken from High edge to Low edge exceed the counter limit, then the counter saturates to its max value instead of rolling over and giving false data.

For example, a set of data may be the worst detections for the last N measurement periods. A profile of the worse detections for the N measurement periods may be stored to the PME. The set of "worst" detections may be based on the prominent types of slopes detected. In one approach, the "worst" detections may be detections of a plurality of overshoot slopes. In another approach, the "worst" detections may be detections of a plurality of voltage droop slopes. The n-level slope detector may be configured according to the type of slope being detected, e.g., the sensor may be configured to monitor for predefined edges within a count limit for detecting a certain type of slope.

For example, referring to the slope trace method 602 of FIG. 6, for the plurality of slopes, minimum counts 610 and maximum count 612 of each of the plurality of slopes detected are entered into a log. In an example of creating a slope trace of a voltage droop, the configuration of the slope having the worst case droop number 614 may be selected from the log of maximum counts 612. The worst case droop number 614 may be reset to a zero value on scom read.

In one approach, the worst case droop number 614 may be used by the PME to reprogram the n-slope detector 604 of the processor (dashed line). The configuration of the worst case droop number 614 may be used to program the count limit of the n-slope detector 604, thereby indicating the parameters of the n-slope detector to adjust the power, e.g., throttle. In one approach, the link between determining the worst case droop number 614 of the slope trace method 602 may be disabled from the n-slope detector 604.

For example, in one approach, during bring-up and running dI/dt (e.g., droop) stressmark and reference workloads, the slope detector (such as the DDS associated with the slope detector logic) may be configured from a very strict to a very relaxed configuration using different throttling patterns. Data is collected for the N worst detections seen in each configuration point. The complete profile may be used to set the appropriate settings as per the sensor measurements. A calibration of counter limit settings allows improvements for a set of core processors since a counter limit may not be a universal setting for all processors.

In one approach, the method includes updating the log with additional slopes detected by the slope trace method. A modified (or next) configuration may be selected based on the updated log of slopes. In some approaches, when the processor is remote, for example, in use at the customer location, the PME may remotely manage the slope detector of the processor. Thus, updating the log in a setting where the processor is remote may include the PME receiving from the remote processor additional slopes detected by the slope trace method. A modified (or next) configuration of the slope detector may be selected based on the updated log of the slopes received form the remote processor.

In one approach, the slope trace logic may include machine learning that applies learned values of the voltage levels of a processing application, workload, etc. to the method of creating a slope trace. For example, once the slope trace is programmed, the slope trace logic continues tracing the slopes detected by the n-slope detector, such as the maximum number of cycles and minimum number of cycles from one edge to a second edge. The slope trace logic and slope detector are working independently. Each may be configured to same predefined high/low edge (e.g., used for calibration, slope tuning by PME) or each may be configured differently. For example, a slope detector detects and acts, and a slope trace will collect data as described herein.

In a customer environment, the customer runs the workload, and the PME receives the slope trace numbers continuously generated during the running of the workload. Thus, in addition to data shared from a remote processor via machine learning, such as temperature, humidity, voltage, etc., the additional parameters derived from the slope trace logic may be included in machine learning mechanisms associated with the processor. In one approach, the processor continuously reads the slope trace logic of the slopes generated from the processor, and through machine learning, adjusts the voltage applied to the processor according to recent slope trace logic parameters (e.g., increases applied voltage in response to degradation of the processor as indicated by the slope trace).

In one example, in a customer setting, the detector may be configured as appropriate for the field and may collect data for the N worst detections seen during the measurement period. The data may be used to improve "call home data" (e.g., for configuration of the next product), or to tune settings specifically to customer behavior. For example, referring to FIG. 6, the minimum count 610 determined from the slope trace method 602 may be useful data for logging in the field.

In one example, in zTelum, a dynamic DDS slope counter limit setting may be included with every core and DDS. The PME may perform 24×7 data logging of droop information for every DDS and record the collected data into call home data.

According to one inventive aspect, a solution to conventional manual calibration processes associated with conventional slope detection method includes an automatic self-calibrated configurable power response for effective droop and power management. Using a non-intrusive slope tracing mechanism with feedback as described herein with the n-slope detector, a change in slope may be dynamically managed for each of the core, chips, etc. A non-intrusive and feedback-based slope tracing mechanism allows automated calibration of a configuration for slope settings quickly without manual intervention.

According to one inventive aspect, a methodology and a mechanism includes an autonomous calibration of slope detectors based on the slope profile of the voltage of a processing core. In one example, a methodology may include POR for zMetis. Now referring to FIG. 7, a flow-chart of a method 700 for calibration of n-slope detector based on a processor having the n-slope detector is shown, according to one inventive aspect. The method 700 may be performed in accordance with the present invention in any of the environments depicted in FIGS. 1-8, among others, in various inventive aspects. Of course, more or fewer operations than those specifically described in FIG. 7 may be included in method 700, as would be understood by one of skill in the art upon reading the present descriptions.

Each of the steps of the method 700 may be performed by any suitable component of the operating environment. For example, in various inventive aspects, the method 700 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

The method 700 begins with operations for calibration for worst case. This calibration may be carried out during the bring-up process. In one example, the operations of method 700 describe that while running stressmark, a power management engine (PME) searches for the best slope settings.

Figure 7:
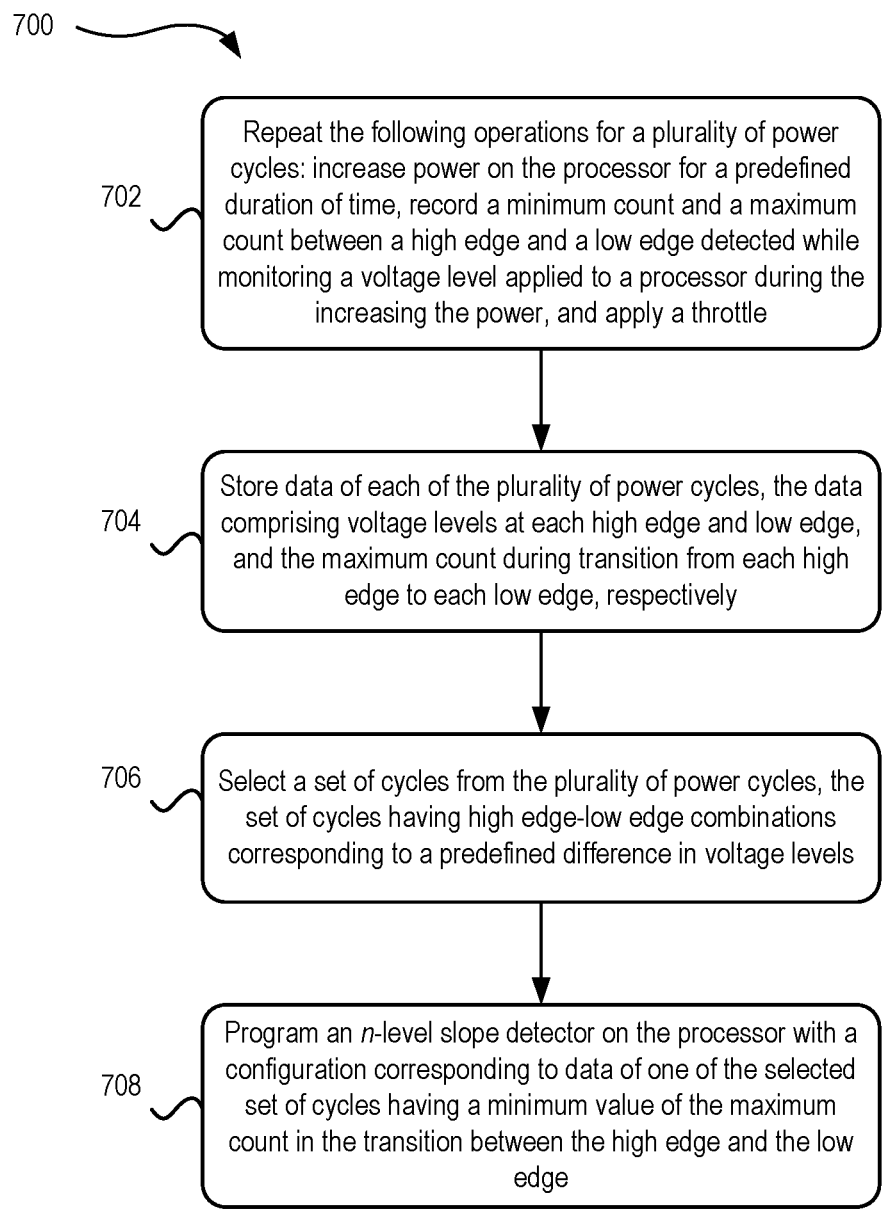
FIG. 7 is a flowchart of a method for calibration of an n-slope detector based on a processor having the n-slope detector, in accordance with one inventive aspect of the present invention.

As shown in FIG. 7, method 700 may initiate with operation 702 that includes repeating for plurality of power cycles the following operations: increasing power on the processor for a predefined duration of time, recording a minimum count and a maximum count between a high edge and a low edge, and applying a throttle. In one example, a power cycle may include switching dI/dt ON for 1 millisecond (ms) and cooling off for 1 second (s), where this cycle is repeated in about 1 minute. On the OFF time, the throttle dies down so that in the second ON dI/dt, a droop is captured which is not affected by the throttle response for the first droop. The throttle response would diminish in the cooling off period.

The power cycle process of operation 702 may be repeated for various High-Low edges and captures at each power cycles the minimum/maximum count between the High and Low edges. A minimum relative voltage level may also be recorded for each cycle. The parameters of the power cycles are configured so that no failures occur during the search.

Operation 704 includes storing data of each of the plurality of power cycles. The data from each of the plurality of power cycles includes voltage levels at each high edge and low edge, and the maximum count during transition from each high edge to each low edge, respectively. In one approach, the high edge may be selected to be less than the voltage level captured in the absence of increasing the power. In one approach, the low edge may be selected to be one above a sensor filter edge the sensor capturing the respective voltage levels. This may be a process to tune Filter edge.

In one example, the data may be stored in a table according to High edges, Low edges, and the count of the Maximum number of cycles in the transition from the programmed High edge to the Low edge.

Operation 706 includes selecting a set of cycles from the plurality of power cycles, the set of cycles having high edge-low edge combinations corresponding to a predefined difference in voltage levels. The predefined difference in voltage levels may be configurable.

Operation 708 includes programming an n-level slope detector on the processor with a configuration corresponding to data of one of the selected set of cycles having a minimum value of the maximum count in the transition between the high edge and the low edge. The configuration is automatically programmed for the n-level slope detector(s) used in comparable processors. The configuration includes a relative voltage level value for a predefined high edge, a relative voltage level value for a predefined low edge, and a count limit value between the predefined high edge and the low edge corresponding to the minimum value of the maximum count, the values based on the data of the one of the selected set of cycles.

In one aspect of the calibration method 700, the calibration may include validation of the programmed configuration. In one approach, while running a reference workload on the processor, the method includes monitoring a throttle response using the n-slope detector having the configuration programmed during calibration of the power management of the processor. The monitoring may take place within the max performance penalty threshold in order to minimize the frequency of throttling the processor.

In another aspect of the calibration method 700, the processor may be remote from the PME. In one approach, monitoring the calibrated n-slope detector may include receiving from the processor recorded data corresponding to the processor activity and re-calibrating a configuration of the n-slope detector. In a preferred approach, re-calibrating a configuration of the n-slope detector includes restarting the method of calibrating the n-slope detector based on the processor.

In one example, while in customer settings, a PME may monitor all the "call-home" recorded data to model customer specific behavior. If no throttling is ever seen, no changes to the calibration of the configuration of the n-slope detector is needed. If throttling is taking place during processor activity, the PME may analyze detector trace data to check whether the throttling may be avoided. If failures are occurring on the processor, the PME may analyze detector trace data and re-calibrate the n-slope detector accordingly.

FIG. 8 illustrates configurable throttle patterns that may represent a response to detecting the n-level slopes. As shown in part (b), 16 different level of throttles are represented by a distinct pattern. Part (a) represents a pattern having 32 different levels of throttle as provided by zTelum. The methods described herein allow more efficient use of the throttling patterns provided by zTelum and next generation processors. A configurable throttle pattern allows a more aggressive or a more relaxed throttling. In a preferred approach, managing the power applied to a processor allows an improved throttle pattern that mitigates alterations in performance of the processor.

It will be clear that the various features of the foregoing systems and/or methodologies may be combined in any way, creating a plurality of combinations from the descriptions presented above.

It will be further appreciated that inventive aspects of the present invention may be provided in the form of a service deployed on behalf of a customer to offer service on demand.

The descriptions of the various inventive aspects of the present invention have been presented for purposes of illustration, but are not intended to be exhaustive or limited to the inventive aspects disclosed. Many modifications and variations will be apparent to those of ordinary skill in the art without departing from the scope and spirit of the described inventive aspects. The terminology used herein was chosen to best explain the principles of the inventive aspects, the practical application or technical improvement over technologies found in the marketplace, or to enable others of ordinary skill in the art to understand the inventive aspects disclosed herein.

What is claimed is:

1. A computer-implemented method for detecting n-level slopes for a voltage level in a processor, wherein n is greater than 1, the method comprising:
   monitoring a voltage in a processor for a voltage level corresponding to a predefined first edge;
   monitoring for a voltage level corresponding to a predefined second edge within a first count limit from detection of the predefined first edge;
   in response to detecting the predefined second edge within the first count limit, monitoring for a voltage level corresponding to a predefined third edge within a second count limit from detection of the predefined second edge;
   in response to detecting the predefined third edge within the second count limit, detecting a shape of a non-linear slope based on the voltage levels detected at the predefined first edge, the predefined second edge, and the predefined third edge; and
   adjusting a power applied to the processor based on the detected shape of the non-linear slope.

2. The computer-implemented method of claim 1, comprising, in response to not detecting a predefined second edge within the first count limit, restarting the method.

3. The computer-implemented method of claim 1, wherein each of the first count limit and the second count limit is a predefined number of cycles.

4. The computer-implemented method of claim 1, wherein the monitoring is by an n-level slope detector, wherein n is an integer greater than 1, the n-level slope detector comprising a voltage sensor for monitoring voltage levels.

5. The computer-implemented method of claim 4, wherein n is an integer greater than 2.

6. The computer implemented method of claim 4, wherein the voltage sensor is functional as a digital droop sensor (DDS).

7. The computer-implemented method of claim 1, wherein each predefined edge and each count limit are configured according to a processing behavior of the processor.

8. The computer-implemented method of claim 1, wherein the method is performed for each core in the processor.

9. A computer program product, the computer program product for detecting n-level slopes for a voltage level in a processor, wherein n is greater than 1, comprising a computer readable storage medium having program instructions embodied therewith, the program instructions readable and/or executable by a computer to cause the computer to:
   monitor, by a slope detector, a voltage in a processor for a voltage level corresponding to a predefined first edge;
   monitor, by the slope detector, for a voltage level corresponding to a predefined second edge within a first count limit from the detection of the predefined first edge;
   in response to detecting the predefined second edge within the first count limit, monitor, by the slope detector, for a voltage level corresponding to a predefined third edge within a second count limit from detection of the predefined second;

in response to detecting the predefined third edge within the second count limit, detect a shape of a non-linear slope based on the voltage levels detected at the predefined first edge, the predefined second edge, and the predefined third edge; and adjust a power applied to a processor based on the detected shape of the non-linear slope.

10. The computer program product of claim 9, the program instructions readable and/or executable by the computer to cause the computer to: in response to not detecting a second edge within the first count limit, restart the program instruction.

11. A system comprising a processing circuit, wherein the circuit comprises an n-level slope detector, n being greater than 1, wherein the n-level slope detector comprises a voltage sensor; and logic integrated with the processing circuit, executable by the processing circuit, or integrated with and executable by the processing circuit, the logic being configured to:

monitor, by the slope detector, a voltage level of the processing circuit for a voltage level corresponding to a predefined first edge;

monitor, by the slope detector, for a voltage level corresponding to a predefined second edge within a first count limit from detection of the first edge;

in response to detecting the predefined second edge within the first count limit, monitor, by the slope detector, for a voltage level corresponding to a predefined third edge within a second count limit from detection of the first edge; and in response to detecting the predefined third edge within the second count limit, detect, by the slope detector, a shape of a non-linear slope comprising the voltage levels detected at the predefined first edge, the predefined second edge, and the predefined third edge; and adjust a power applied to the processing circuit based on the detected shape of the non-linear slope.

12. The system of claim 11, the logic being configured to: in response to not detecting a second edge within the first count limit, restart the logic being configured to monitor, by the slope detector, for a voltage level corresponding to a predefined first edge.

13. The system as recited in claim 11, wherein each predefined edge and each count limit is configured according to a processing behavior of the processing circuit.

14. A computer-implemented method for using a slope trace based on voltage levels of a processor, the method comprising:

detecting a plurality of slopes using a slope trace;

storing data from the plurality of slopes in a log, the data comprising a minimum count and a maximum count for a transition between a predefined high edge and a predefined low edge for each of the detected plurality of slopes; and selecting a configuration for a slope detector based on a set of data from the plurality of slopes, wherein the selection includes a maximum count below a predefined count threshold.

15. The computer-implemented method of claim 14, wherein the slope trace counts a number of cycles in the transition from the predefined high edge to the predefined low edge.

16. The computer-implemented method of claim 14, further comprising, updating the log with additional slopes detected by the slope traces; and selecting a next configuration for the slope detector.

17. The computer-implemented method of claim 16, wherein the processor is remote from a power management engine running the method for using the slope trace based on the processor, wherein the updating comprises:

receiving, from the processor, the additional slopes detected by the slope trace, and selecting a next slope configuration for the slope detector based on the updated log of the slopes received from the processor.

18. A computer-implemented method for calibration of a slope detector based on a processor having the slope detector, the method comprising:

repeating the following operations for a plurality of power cycles:

increasing power on the processor for a predefined duration of time, recording a minimum count and a maximum count between a high edge and a low edge detected while monitoring a voltage level applied to a processor during the increasing the power, and applying a throttle;

storing data of each of the plurality of power cycles, the data comprising voltage levels at each high edge and low edge, and the maximum count during transition from each high edge to each low edge, respectively;

selecting a set of cycles from the plurality of power cycles, the set of cycles having high edge-low edge combinations corresponding to a predefined difference in voltage levels; and programming the slope detector on the processor with a configuration corresponding to data of one of the selected set of cycles having a minimum value of the maximum count in the transition between the high edge and the low edge.

19. The computer-implemented method of claim 18, wherein the high edge is selected to be less than the voltage level captured in the absence of increasing the power, wherein the low edge is selected to be one above a sensor filter edge of the sensor capturing the respective voltage levels.

20. The computer-implemented method of claim 18, wherein the configuration includes a relative voltage level value for a predefined high edge, a relative voltage level value for a predefined low edge, and a count limit value between the predefined high edge and the low edge corresponding to the minimum value of the maximum count, the values based on the data of the one of the selected set of cycles.

21. The computer-implemented method of claim 18, further comprising, while running a reference workload on the processor, monitoring a throttle response using a n-slope detector having the programmed configuration.

22. The computer-implemented method of claim 18, wherein the processor is remote from a power management engine running the calibration of the n-slope detector, wherein the method further comprises monitoring the n-slope detector having the programmed configuration.

23. The computer-implemented method of claim 22, wherein the monitoring comprises:

receiving, from the processor, recorded data corresponding to a slope trace of the processor, and re-calibrating a configuration of the n-slope detector.

24. The computer-implemented method of claim 23, wherein re-calibrating the configuration of the n-slope detector includes restarting the method.

\* \* \* \* \*